United States Patent [19]
Uwaji et al.

[11] Patent Number: 5,932,066
[45] Date of Patent: Aug. 3, 1999

[54] FILM REMOVING DEVICE FOR RESIN MOLDED MATERIAL

[75] Inventors: Tesuo Uwaji; Naokazu Takeuchi; Yuji Inagaki; Toru Ikeya, all of Nagoya, Japan

[73] Assignee: Mitsubishi Heavy Industries, Ltd., Tokyo, Japan

[21] Appl. No.: 08/959,665

[22] Filed: Oct. 29, 1997

[30] Foreign Application Priority Data

Nov. 1, 1996 [JP] Japan ..................... 8-291385

[51] Int. Cl.⁶ ............................................. B32B 35/00
[52] U.S. Cl. .................... 156/584; 156/344; 29/426.5
[58] Field of Search .................... 156/344, 584, 156/94; 29/239, 426.1, 426.3, 426.5; 264/37.3, 37.33

[56] References Cited

U.S. PATENT DOCUMENTS

| | | | |
|---|---|---|---|
| 5,304,276 | 4/1994 | MacLeod et al. | 156/344 |
| 5,376,210 | 12/1994 | Brochu et al. | 156/344 |
| 5,807,460 | 9/1998 | Yamamoto | 156/584 X |

FOREIGN PATENT DOCUMENTS

| | | |
|---|---|---|
| A-1 285324 | 11/1989 | Japan . |
| 63-202409 | 3/1991 | Japan .......... 156/344 |
| B2-5 57093 | 8/1993 | Japan . |
| A-7 171832 | 7/1995 | Japan . |
| A-7 214558 | 8/1995 | Japan . |
| A-7 256640 | 10/1995 | Japan . |
| A-7 256643 | 10/1995 | Japan . |
| A-8 281650 | 10/1996 | Japan . |

*Primary Examiner*—Mark A. Osele

[57] ABSTRACT

According to a film removing device, a film-coated resin molded material having a film coated on one surface of a matrix resin is flattened by a flattening roll in a heating chamber. Further, the film-coated resin molded material is fed between a peeling roll and a feeding roll of roll type rolling means for rolling and stretching. The velocity of a peeling surface of the peeling roll is made relatively higher than the velocity of a feeding surface of the feeding roll, whereby a difference in elongation between the matrix resin and the film, and a shearing force are produced to peel the film. An applicator type supply device supplies a liquid as frictional force reducing means (e.g. water) to the peeling surface and the feeding surface. Thus, a frictional force is reduced, and stretching accompanying rolling fully works. Consequently, the film becomes easy to fracture and peel, and its peeling can be performed effectively.

12 Claims, 16 Drawing Sheets

FILM REMOVING DEVICE FOR RESIN MOLDED MATERIAL

BACKGROUND OF THE INVENTION

This invention relates to a film removing device for a rein molded material which can more reliably remove a film formed on the surface of a resin material (matrix resin).

In recent years, there has been an increase in the necessity for recycling a film-coated resin material (a resin molded material coated with a film), which has become useless, from the point of view of environmental protection. To recycle a used resin material having a film of a paint or the like formed on a resin material (matrix resin), i.e., a film-coated resin molded material, it is necessary to process it. During its processing, however, the film penetrates the resin material, markedly lowering the mechanical properties of the resin material. Thus, the film must be removed from the surface of the resin material before processing for recycling.

The following methods have been proposed to remove the film:

(1) Shot blasting method for removing the film by a shot blast.
(2) Filtration method for melting the coated resin through an extruder, and filtering the film through a filter.
(3) Dry roll type rollingmethod for rolling aworkpiece in dry condition by use of a roll pair, and removing the film by utilizing a shearing action resulting from the difference in peripheral velocity between the rolls (disclosed, for example, in Japanese Laid-Open Patent Publication No. 214558/95 and Japanese Laid-Open Patent Publication Nos. 256640/95 to 256643/95).

However, the above-described methods thus far proposed posed the following problems:

[Problems with the shot blasting method]

With the shot blasting method, it is difficult to remove the film evenly, if the shape of the molded resin material is complicated. Moreover, if the blast is strongly shot to raise the treating speed, the resin material is burnt to cause quality deterioration, or the blast is embedded in the resin material to make its separation from the resin material difficult.

[Problems with the filtration method]

With the filtration method, the film, if thin, deforms and passes through the filter, so that its separation is difficult. An increase in the amount of extrusion for raising the treating speed will impose an excessive compressive load on the resin material, thereby deteriorating the resin material. Furthermore, the need for frequent replacement of the filter arises. Thus, there are limits to the decrease in the treating time and the reduction of the treating cost.

[Problems with the dry roll type rolling method]

The dry roll type rolling method is a method for solving the problems of the shot blasting method and the filtration method. According to the dry roll type rolling method, as shown in FIG. 16, a film-coated resin molded material 010 having a film 012 coated on a matrix resin 011 is rolled between a film-side roll 022 having rubber 022a on its peripheral surface and a matrix-side roll 021.

The conventionally proposed dry roll type rolling method, however, has room for improvement in the following respects: When the roll temperature is 30 to 40° C., the film 012, part of the matrix resin 011 and the primer stick remarkably to the film-side roll 022. In the presence of this sticking, the expected film peeling action does not take place. Since the film is minimally separated, continuous operation is difficult. The primer is an undercoat for enhancing the adhesion of the coating.

At a roll temperature above 40° C., the film, part of the matrix resin, and the primer stick to a lower degree. During continuous operation, however, the roll surface temperature rises. As a result, the coefficient of friction between the roll surface and the film, and that between the roll surface and the matrix resin change. Thus, separation of the film becomes difficult, posing difficulty in setting the roll temperature at which operation is possible.

SUMMARY OF THE INVENTION

The object of the present invention is to provide a film removing device for a rein molded material, which can solve the above-described problems with film removal by the conventional dry roll type rolling method.

The invention employs the technique of solution coating as means of reducing friction. Conventional techniques for applying a solution to the cooled roll surface of a film forming machine are shown, for instance, in two publications (Japanese Patent Publication No. 57093/93 and Japanese Laid-Open Patent Publication No. 285324/89). The techniques disclosed in these publications involve applying a solution to the surface of a cooling roll, thereby increasing intimate contact between the film and the cooling roll to improve cooling properties. The inventors add that the techniques disclosed in those publications, therefore, are different from the present invention in the object, action and effect of invention and do not interfere with the technical advance of the present invention.

As a solution to the aforementioned problems, the present invention is constituted by a film removing device for a film-coated resin molded material having a film-coated on one surface of a matrix resin, the film removing device comprising rolling means; the rolling means having a peeling surface in continuous contact with the film-coated resin molded material from the film side, and a feeding surface in continuous contact with the film-coated resin molded material from the resin side; the velocity of the peeling surface being relatively made higher than the velocity of the feeding surface in the direction of travel of the film-coated resin molded material; the rolling means being adapted to compress and stretch the film-coated resin molded material by the peeling surface and the feeding surface, while continuously pinching and feeding the film-coated resin molded material by the two surfaces;

the film removing device exerting a shearing force between the film and the matrix resin of the film-coated resin molded material by using a difference in elongation between the matrix resin and the film, and a difference in relative velocity between the feeding surface and the peeling surface, thereby peeling the film from the matrix resin;

the film removing device further including frictional force reducing means for reducing a frictional force at least at the interface between the film and the peeling surface.

Preferably, the above film removing device further includes heating means capable of heating the film-coated resin molded material prior to a rolling action by the rolling means.

Preferably, the above film removing device further includes flattening means which is composed of two rolls disposed on parallel axes and which flattens the resin molded material having a three-dimensional shape into a two-dimensional shape prior to a rolling action by the rolling means.

Preferably, the above rolling means comprises a peeling roll and a feeding roll which are two cylindrical rolls perpendicular to the direction of flow of the film-coated resin molded material and disposed on parallel axes on both sides of the surface of the film and the surface of the matrix resin.

Preferably, the above rolling means comprises a cylindrical peeling roll, and a metal belt supported in an endless form by at least three rolls, provided so as to surround a part of the circumference of the peeling roll from the outer peripheral side of the peeling roll, and pinching the film-coated resin molded material in collaboration with the surface of the peeling roll to make the film-coated resin molded material pressable continuously toward the center of the peeling roll.

Preferably, the above rolling means comprises a peeling roll having a peeling surface which is a corrugated uneven surface whose cross section perpendicular to the axis is in a corrugated form and whose corrugations are twisted in the axial direction; and one of a feeding roll having a feeding surface which is a knurled uneven surface, and a metal belt.

Preferably, the above frictional force reducing means is a liquid which does not dissolve the film or the matrix resin.

Preferably, the liquid is a material selected from water, a detergent and an oil.

Preferably, the above frictional force reducing means is a surface treated film coated on the feeding surface or the peeling surface.

Preferably, the above frictional force reducing means is a fine powder inserted into the interface between the feeding surface or the peeling surface and the surface of the film-coated resin molded material.

Preferably, the above liquid can be supplied by an applicator type or spray type liquid supply device.

Preferably, the above liquid can be supplied by a liquid supply device composed of a dipping tank where the surface of one of the feeding roll and the peeling roll can be partly dipped.

DETAILED DESCRIPTION OF THE PREFERRED EMBODIMENTS

Figure 1:
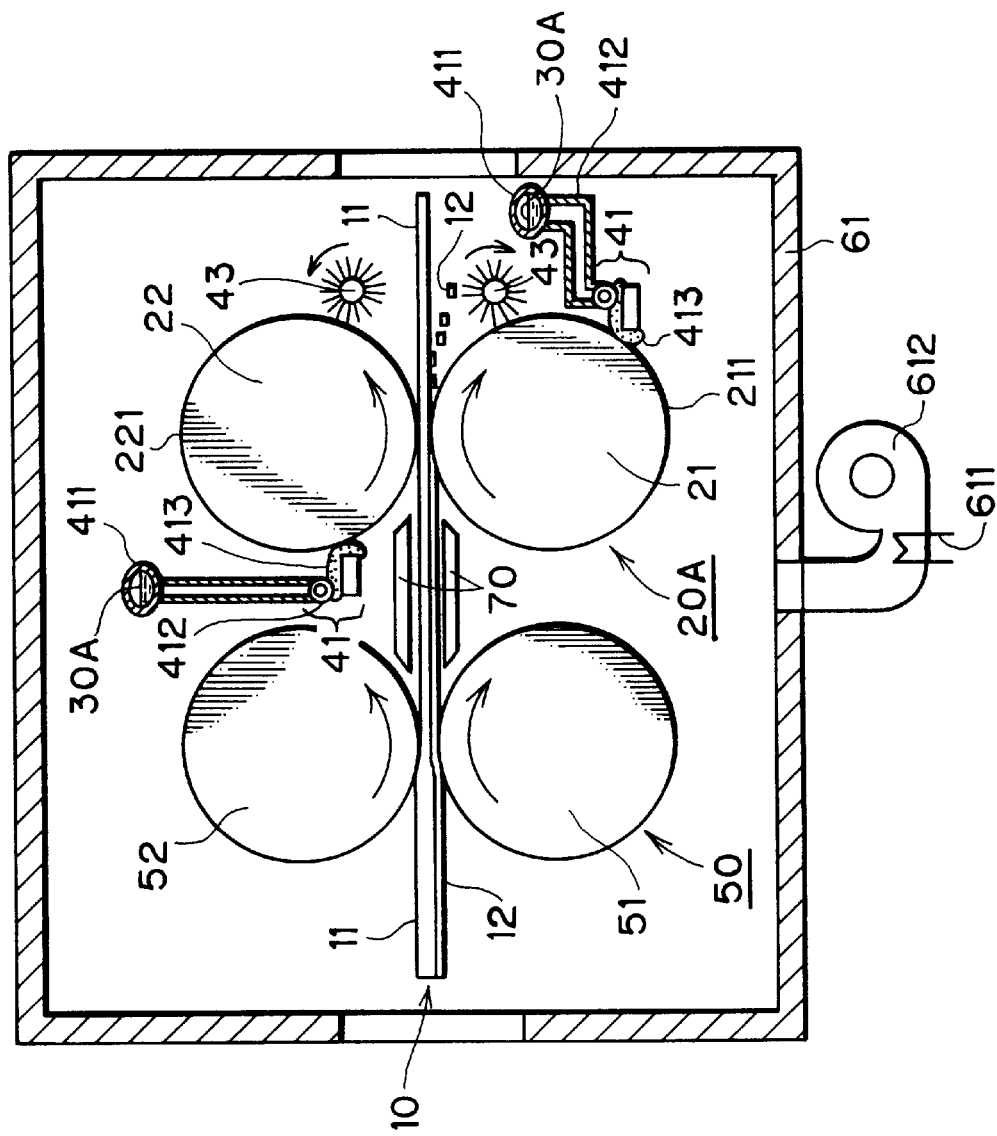
FIG. 1 is a constitutional view of a first embodiment of the present invention as viewed from the front.

The aforementioned various aspects of the present invention will now be described with emphasis on their actions and effects.

The actions and effects of the first aspect of the invention are as follows:

A film-coated resin molded material (also referred to as a workpiece) having a coating (film) on one surface of a matrix resin (matrix) is pinched between a surface in continuous contact with the film-coated resin molded material from the film side (this surface is called a peeling surface), and a surface in continuous contact with the film-coated resin molded material from the resin side (this surface is called a feeding surface). As a result, the workpiece can be continuously fed, and simultaneously compressed and stretched. A generally known example of means for this purpose is rolling means using two rolls. In this case, the feed speed of the workpiece is determined by the velocity of the feeding surface. When the velocity of the peeling surface of the rolling means is relatively made higher than the velocity of the feeding surface, the difference in velocity- between the film and the matrix resin results in a shearing force. It is customary practice to utilize this action in peeling the film from the matrix resin.

The provision of frictional force reducing means on the film side as in the present invention brings the following effects:

1) When the surface temperature of the peeling surface is as low as about 40° C., the film is prevented from sticking to the peeling surface.

2) The surface temperature of the peeling surface becomes high depending on the operating conditions. Under high temperature conditions, the film peeling efficiency rises.

The prevention of sticking of the film to the peeling surface at low temperatures is partly due to the constitution of the frictional force reducing means. Another reason for this prevention is that the following causes of the aforementioned disadvantage are eliminated by the presence of the frictional force reducing means:

At low temperatures, the film sticks to the peeling surface, impeding continuous peeling. The cause for this may be as follows: The adhesive strength between the film and the primer or between the primer and the matrix resin is so high that heat generation during shearing is great. This causes partial fusion of the matrix resin, and the fusion product sticks to the peeling surface.

Assume, here, that frictional force reducing means is provided on the feeding surface, or on the feeding and peeling surfaces. In this case, the frictional force reducing means is interposed between the peeling surface and the film or between the feeding surface and the fused matrix resin in the peeling step. Thus, it becomes possible to inhibit the sticking of the feeding surface or the peeling surface to the film or the matrix resin after peeling.

Various frictional force reducing means are available as will be described later on. A preferred type of the frictional force reducing means is that which can be brought away with the peeled matter. If the frictional force reducing means is that integrated with the peeling surface or feeding surface, it is preferably a substance non-sticky to the fused resin.

Figure 12:
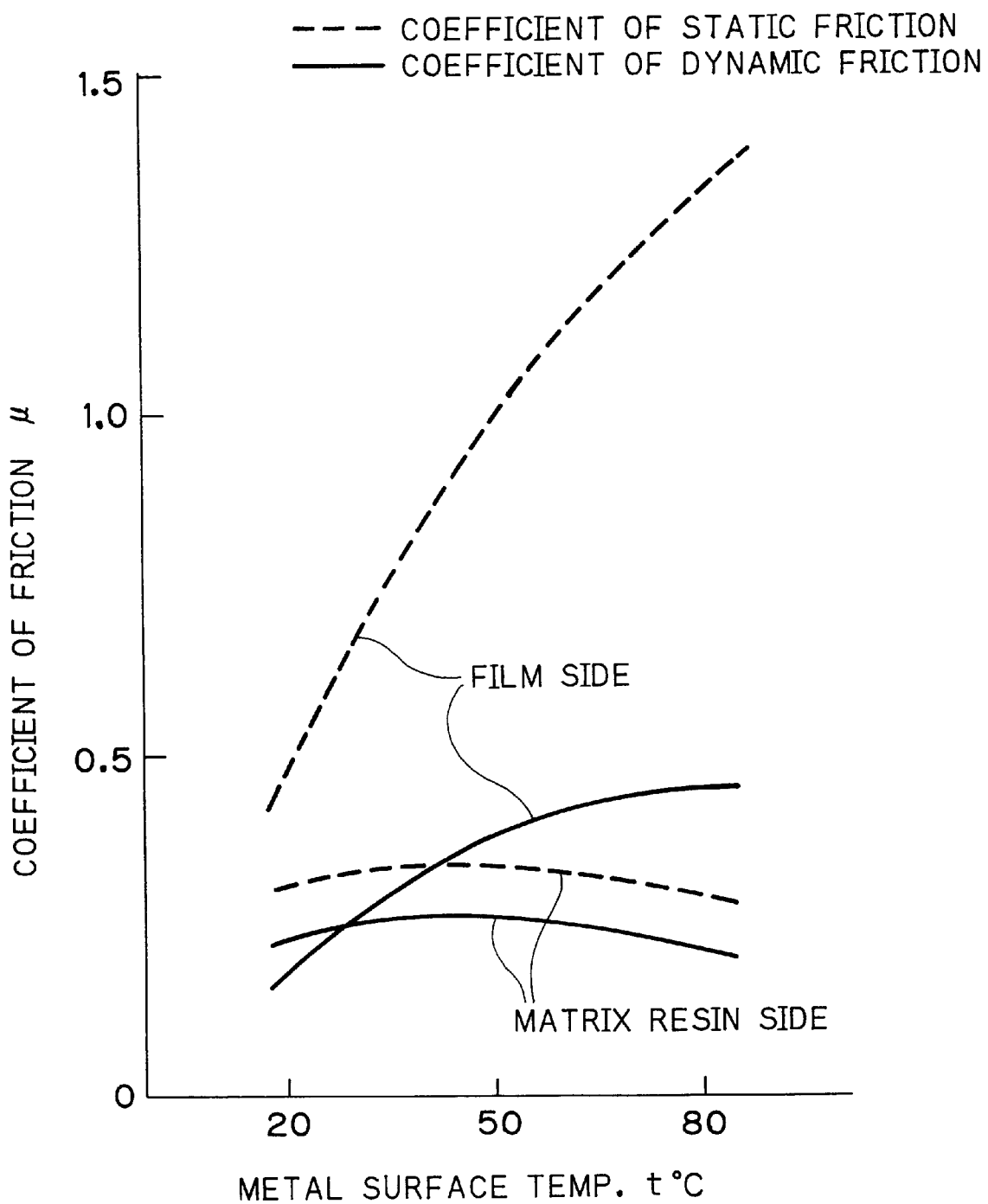
FIG. 12 is a characteristics graph showing the temperature characteristics of the coefficient of friction.

When frictional force reducing means is provided at least between the peeling surface and the film under high temperature conditions, the peeling efficiency is increased. The mechanism of this action is not entirely clear, but can be presumed as follows:

Generally, the coefficient of friction between the film or the matrix resin and metal depends on temperature. The temperature characteristics of this coefficient of friction are depicted in FIG. 12. As shown in FIG. 12, the coefficient of friction of the film, including the coefficient of static friction and the coefficient of dynamic friction, increases with the increase in the interface temperature. On the other hand, the coefficient of friction of the matrix resin, including the coefficient of static friction and the coefficient of dynamic friction, does not increase, but tends to slightly decrease, according to the rise in the interface temperature. Furthermore, the coefficient of friction between the film and metal is generally higher than the coefficient of friction between the matrix resin and metal.

A mention is made here of the process in which the film-coated resin molded material is rolled and accelerated while being pinched between two surfaces which have relative velocities on the matrix resin side and the film side and which move with a certain rolling capacity. A high power is required during the rolling of the resin molded material into a size corresponding to the nip between the two surfaces.

In detail, while the resin molded material is biting into the nip of the rolling means, a great power is required, so that the resin molded material makes a motion most subject to the power. That is, the surface of the resin molded material does not slip on the lower-velocity feeding surface side, and the surface of the resin moves at the same velocity as the feeding surface.

The film-side surface of the resin molded material, on the other hand, slips on the higher-velocity peeling surface side. In short, the moving speed of the surface of the resin molded material rolled by the rolling means having a velocity difference equals the velocity of the lower-velocity feeding surface. Accordingly, even if the velocity of the peeling means is higher than the velocity of the feeding surface, the resin molded material is transported at the velocity of the feeding surface. During this process, the resin molded material is rolled.

Figure 13:
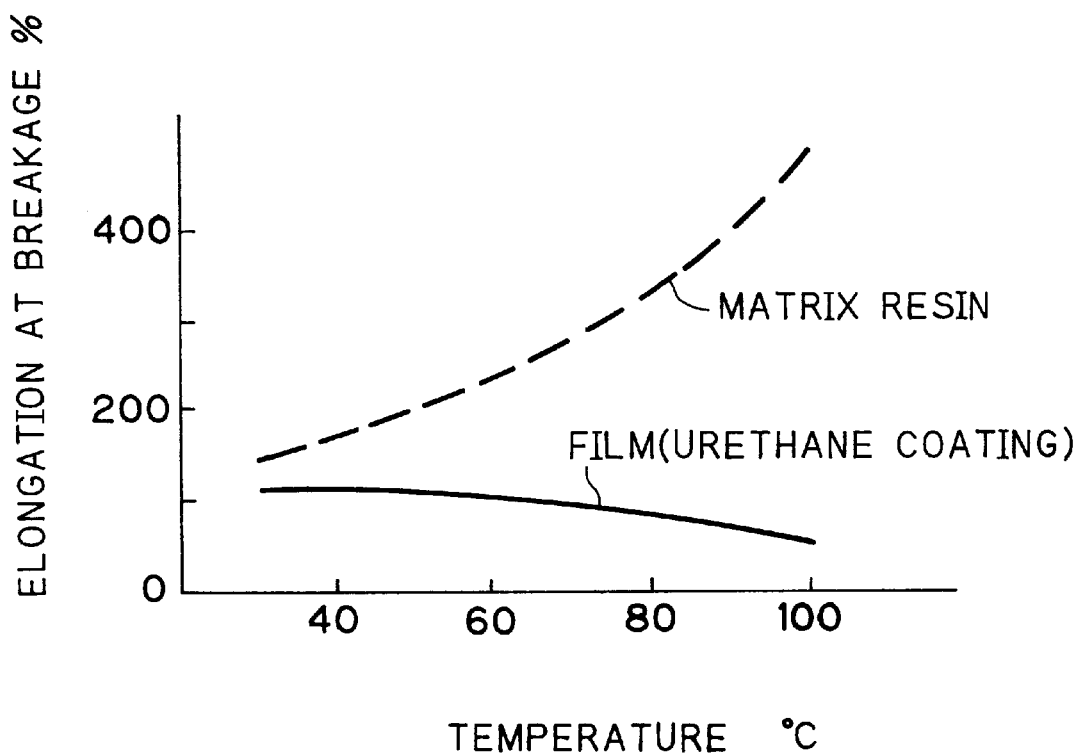
FIG. 13 is a characteristics graph showing shearing characteristics.

Next, assume that the film-coated resin molded material having a film formed on part or whole of the surface thereof is pinched between the feeding surface on the matrix resin side and the peeling surface on the film side with a relative velocity difference existing between the two surfaces. As shown in FIG. 13, the matrix resin and the film are rolled and elongated. Since the matrix resin and the film are different in elongation at breakage, the film with a small elongation at breakage is divided into pieces. At the same time, partial fracture occurs between the film and the primer or between the primer and the matrix resin.

Since the relative velocity difference exists between the feeding surface and the peeling surface, moreover, a frictional force works in the interface between the matrix resin and the feeding surface as well as in the interface between the film and the peeling surface. Owing to this frictional force, a shearing force works within the resin molded material parallel to the interface between the film and the matrix resin.

The division of the film and partial fracture between the film and the matrix resin resulting from the rolling, and severe deformation in the film layer or primer layer or shear destruction at the interface between the primer and the matrix resin caused by the shearing force result in the peeling of the film from the matrix.

The foregoing is an explanation for the general mechanism by which the film-coated resin molded material is pinched between the matrix resin-side feeding surface and the film-side peeling surface having a relative velocity difference therebetween to peel the film from the matrix resin.

Of importance here is the case in which the coefficient of friction is high in the interface between the matrix resin and the feeding surface as well as in the interface between the film and the peeling surface, especially in the interface between the film and the peeling surface, when the film-coated resin molded material is pinched and rolled between the matrix resin-side feeding surface and the film-side peeling surface. In this case, the workpiece is dragged by the peeling surface, and its amount carried into the gap between the feeding surface and the peeling surface (roll nip) increases. Consequently, the stretching of the film and the matrix resin near the interface minimally occurs, impeding the peeling of the film.

If the coefficient of friction in the interface between the film and the peeling surface is low, by contrast, a slip is marked in the matrix resin-feeding surface interface and the film-peeling surface interface. Thus, during the carriage of the workpiece into the gap between the feeding surface and the peeling surface to reach an increased pressure, the workpiece slips at the interface and tries to escape. Hence, the stretching of the film and the matrix resin near the interface easily occurs, promoting the peeling of the film.

Figure 14:
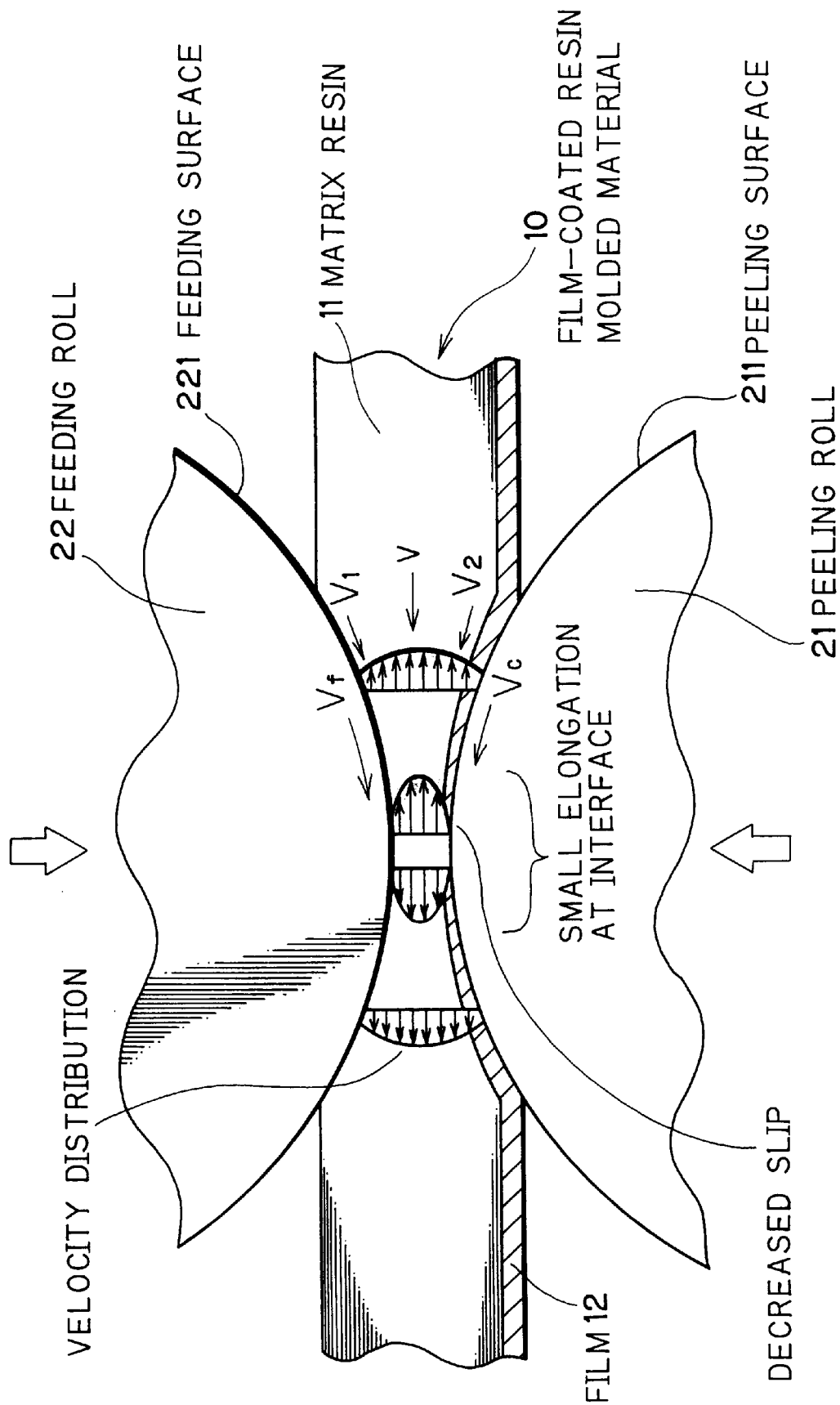
FIG. 14 is an explanation drawing showing a stretching action and a film removing action during a rolling process when the coefficient of friction of the peeling surface is large.
Figure 15:
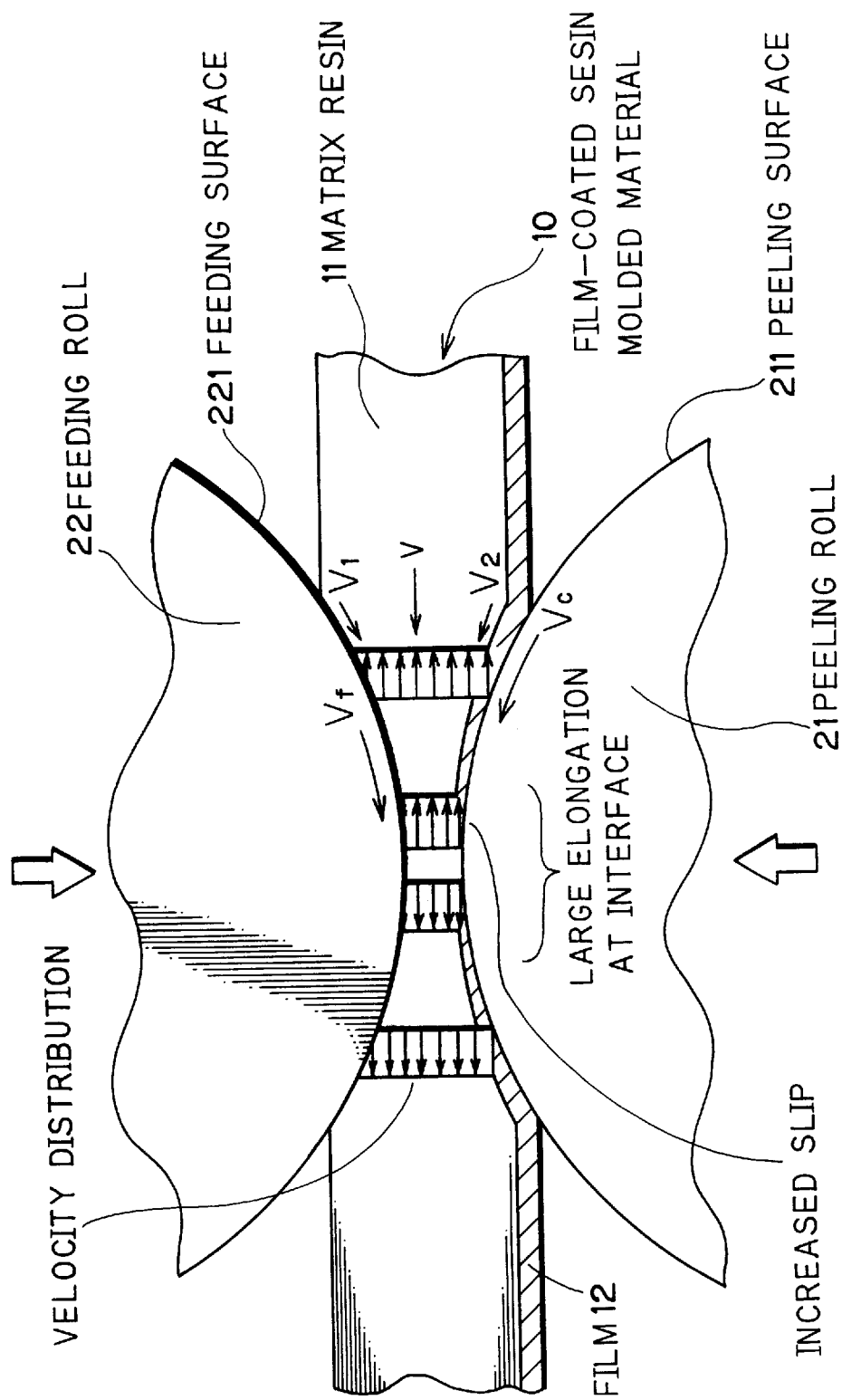
FIG. 15 is an explanation drawing showing a stretching action and a film removing action during a rolling process when the coefficient of friction of the peeling surface is small.
Figure 16:
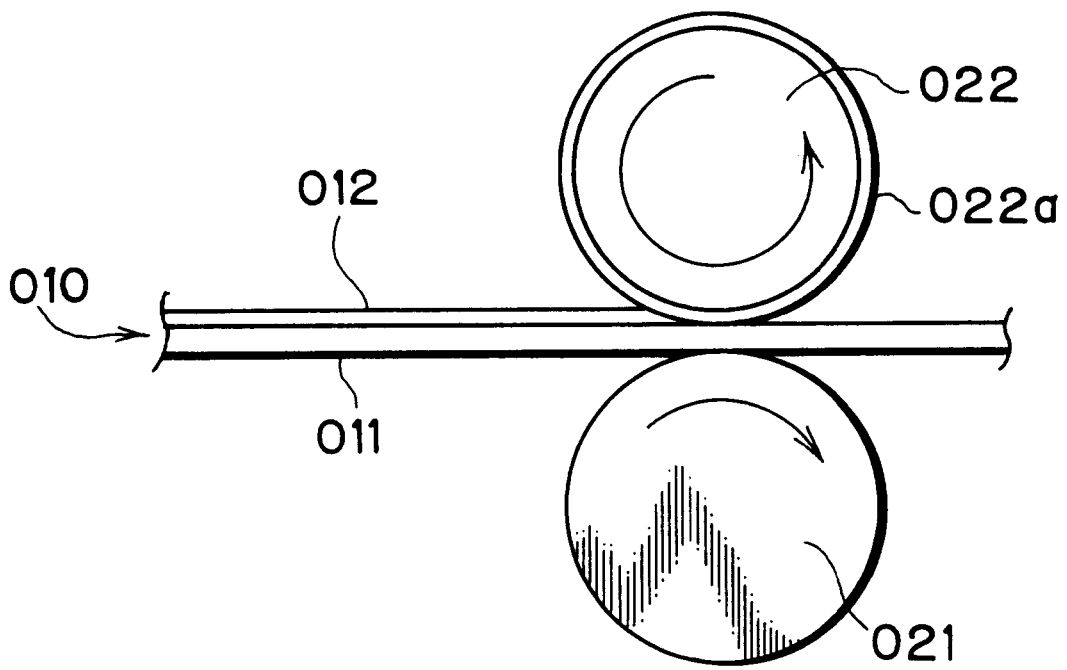
FIG. 16 is a schematic constitutional view showing a conventional film removing device.

The above mechanism of stretching will be described in more detail using models illustrated in FIGS. 14 and 15, in regard to the motion for narrowing the gap between the feeding surface and the peeling surface, with emphasis only on compression-associated stretching and in disregard for the movements of the feeding surface, peeling surface and resin molded material for the purpose of simplification. In FIGS. 14 and 15, the numeral 10 denotes a film-coated resin molded material (workpiece), 11 a matrix resin, 12 a film, 21 a peeling roll, 211 a peeling surface, 22 a feeding roll, 221 a feeding surface, v the velocity of the film-coated resin molded material, $v_c$ the peripheral velocity of the peeling surface, and $v_f$ the peripheral velocity of the feeding surface. In the investigations in FIGS. 14 and 15, the velocities V, $V_c$ and $V_f$ are set at zero.

The film-coated resin molded material 10 is pinched, and a motion for narrowing the gap between the feeding surface 221 and the peeling surface 211 is made. According to compression, the resin molded material laid in the gap between the feeding surface 221 and the peeling surface 211 tries to escape toward a larger gap.

If the coefficient of friction in the interfaces between the matrix resin 11 and the feeding surface 221 and between the film 12 and the peeling surface 211, especially in the interface between the film 12 and the peeling surface 211, is large, however, the resin 11 in contact with the feeding surface 221 or the peeling surface 211 has its movement suppressed by friction as shown in FIG. 14. In this case, stretching occurs slightly in the middle of the resin molded material in the direction of thickness, or only the volume compression of the resin takes place. Stretching of the resin 11 in contact with the feeding surface 221 or the peeling surface 211 does not fully occur.

If the coefficient of friction in the interfaces between the matrix resin 11 and the feeding surface 221 and between the film 12 and the peeling surface 211, especially in the interface between the film 12 and the peeling surface 211, is low, on the other hand, the resin 11 in contact with the feeding surface 221 or the peeling surface 211 does not have its movement suppressed by friction as shown in FIG. 15. This resin 11 slips at the interfaces and escapes toward a larger gap. Thus, the resin mainly at the minimum gap site, as well as the resin near the interfaces, undergoes sufficient stretching.

To promote the peeling of the film 12, it is necessary to stretch the resin molded material 10 near the coated surface sufficiently. To cause the sufficient stretching, it is effective to lower the coefficients of friction at both of the interface between the matrix resin 11 and the feeding surface 221 and the interface between the film 12 and the peeling surface 211, as stated above.

When the temperature at the interface between the film 12 and the peeling surface 211 is as low as 40° C. or lower, the coefficient of friction between the film 12 and the metal is relatively low. Thus, the action that the peeling means pulls the film 12 under frictional force into the gap between the feeding surface 221 and the peeling surface 211 to compress the film 12 there is not very high. Instead, stretching accompanying rolling fully works as under high temperature conditions, causing a tendency toward the division and peeling of the film 12.

The mechanism by which the film 12 is divided and peeled under the above situation may be similar to the action previously stated in regard to the high temperature conditions. Under low temperature conditions, however, the adhesive strength between the film 12 and the primer or between the primer and the matrix resin 11 is so high that heat generation at the time of shearing is great. Thus, partial fusion of the matrix resin 11 occurs, and the fused resin sticks to the peeling surface 211, thereby impeding continuous peeling.

When the temperature at the inter face between the film and the surf ace of the peeling means is higher than 40° C., the coefficient of friction between the film and the surface of the peeling means is relatively high. Thus, the action that the peeling means brings the film under frictional force into the gap between the feeding means and the peeling means to compress its volume becomes high. During the rolling of the film, therefore, the film undergoes volume changes such as compression and expansion, so that the film is not fully stretched any more and becomes minimally fractured.

Here, a liquid which does not dissolve the film or the matrix resin is placed in the interface between the feeding means and the matrix resin and/or in the interface between the peeling means and the film. In this case, the coefficient of friction between the peeling means and the film or between the feeding means and the matrix resin can be decreased by a lubricating effect. This lowers the action that the peeling means brings the film under frictional force into the gap between the feeding means and the peeling means to compress it. As a result, stretching accompanying rolling fully works, facilitating the fracture and peeling of the film. A shearing force can be effectively exerted between the film and the matrix resin, so that the peeling efficiency can be raised.

Here, frictional force reducing means is provided on the feeding surface, or on the feeding surface and the peeling surface. In this case, the frictional force reducing means is present between the peeling surface and the film or between the feeding surface and the matrix resin in the peeling step. Consequently, the sticking of the film or the matrix resin after peeling to the feeding surface or the peeling surface can be inhibited, permitting continuous peeling.

Thus, the frictional force reducing means permits continuous removal of the film regardless of whether the temperature of the film to the interface between the film and the peeling surface is low or high.

If the coefficients of friction on both of the peeling surface and the feeding surface are reduced, however, the degree of the workpiece being bitten into the gap between both surfaces is lowered. Hence, it is better to make the coefficient of friction on the feeding surface somewhat large, with stretching on the feeding face side being slightly sacrificed.

The actions and effects of the second aspect of the invention are as follows: Heating means is used to preheat the workpiece or adjust the temperature of the peeling surface or the feeding surface. In this case, the start-up time is shortened, if high temperature conditions are to be set during a rolling process.

The actions and effects of the third aspect of the invention are as follows: The preheating softens the workpiece, making a flattening treatment easy. Simultaneously, the adhesiveness of the primer lowers, facilitating the peeling of the film. The flattening treatment further enables uniform rolling in the width direction, thus improving the peeling efficiency for the film.

The actions and effects of the fourth aspect of the invention are as follows: Two rolls are disposed on parallel axes, and a predetermined center distance and predetermined revolution speeds or predetermined diameters are selected to form rolling means with different peripheral velocities. When a workpiece is supplied to such rolling means, rolling is performed by the action of the first to third aspects of the invention.

The actions and effects of the fifth aspect of the invention are as follows: A metal belt is supported from its inside by rollers at three points, and its outside is contacted with the circumference of the roll with a predetermined gap existing therebetween, whereby rolling means is formed. When a workpiece is supplied to such rolling means, rolling is performed by the action of the first to third aspects of the invention.

The actions and effects of the sixth aspect of the invention are as follows: When the film-coated resin molded material reaches a temperature of about 100° C. or higher, the adhesive strength of the primer lowers, so that the ratio of the peeling action by shearing to the rolling action increases. To reduce power, therefore, rolling is diminished, and peeling is carried out mainly by shearing. Under this situation, the coefficient of friction between the matrix resin and the surface of the feeding means decreases with increasing temperature of the surface of the feeding means. Thus, a slip occurs between the matrix resin and the feeding means.

If the surface of the feeding means is provided with irregularities, the coefficient of friction between the matrix resin and the surface of the feeding means increases, and so the slip can be prevented. The surface the peeling means may also be provided with smooth irregularities involving minimal increase in the coefficient of friction. In this case, if a slip occurs at the interface between the peeling means and the film, deformation on a microscale is imparted to the film and the matrix resin, whereby peeling can be promoted.

The above provision of irregularities on the surfaces of both of, or the surface of one of, the feeding means and the peeling means enables the film to be peeled from the matrix resin effectively when the surface temperature of the feeding means or the peeling means is high. That provision also increases the force of a bite of the workpiece into the gap between the feeding means or the peeling means, thus alleviating a counteraction accompanying the decrease in the coefficient of friction.

The actions and effects of the seventh aspect of the invention are as follows: Generally, a liquid functions as an agent for decreasing the coefficient of friction. Thus, a liquid can be selected as frictional force reducing means. Furthermore, a liquid penetrates the peeling surface, or surrounds the surface of the peelings to prevent the union of the peelings, thus preventing the entanglement of the peelings and their growth.

The actions and effects of the eighth aspect of the invention are as follows: According to the method of the invention, the film-coated resin molded material is sandwiched between the feeding means on the matrix resin side and the peeling means on the film side that have a relative velocity difference between their surfaces, whereby the film is peeled from the matrix resin. Under this situation, if the treating speed is raised, heat generation between the film and the matrix becomes marked, causing the softening of the matrix, or further its fusion, to lower the peeling rate.

Under these circumstances, a liquid having a boiling point not higher than the softening point or melting point of the matrix resin is used as the liquid. Because of this use, when the matrix resin is heated above its softening point or melting point, it is deprived of heat by the latent heat of evaporation of the liquid, whereby a rise in the temperature is prevented. Thus, the fusion of the matrix resin can be prevented, and the decrease in the peeling rate prevented. Selecting a liquid depending on the temperature of the rolling process gives the desired effects.

The actions and effects of the ninth aspect of the invention are as follows: A surface treated film fulfills the function of decreasing the coefficient of friction. Concretely, it is recommendable to apply surface treatment such as Teflon coating or ceramic coating.

The actions and effects of the tenth aspect of the invention are as follows: A fine powder supplied to the interface lowers the coefficient of friction at the interface. As a fine powder, the use of talc, an inorganic material, is recommendable. Its use gives the same effects as with the liquid in terms of the penetration into the peeling surface and the action of coating the surface of the peelings.

The actions and effects of the eleventh aspect of the invention are as follows: If a liquid is used, the liquid can be applied easily to an arbitrary surface by means of an applicator type or spray type liquid supply device. Thus, the coefficient of friction can be lowered.

The actions and effects of the twelfth aspect of the invention are as follows: The liquid supply device is composed of a dipping tank where the surface of one of the rolls can be partially dipped. This makes it possible to apply a liquid to a predetermined surface easily. Thus, the effect of lowering the coefficient of friction can be exhibited.

The preferred embodiments of the present invention will be described in detail by reference to the appended drawings.

Figure 2:
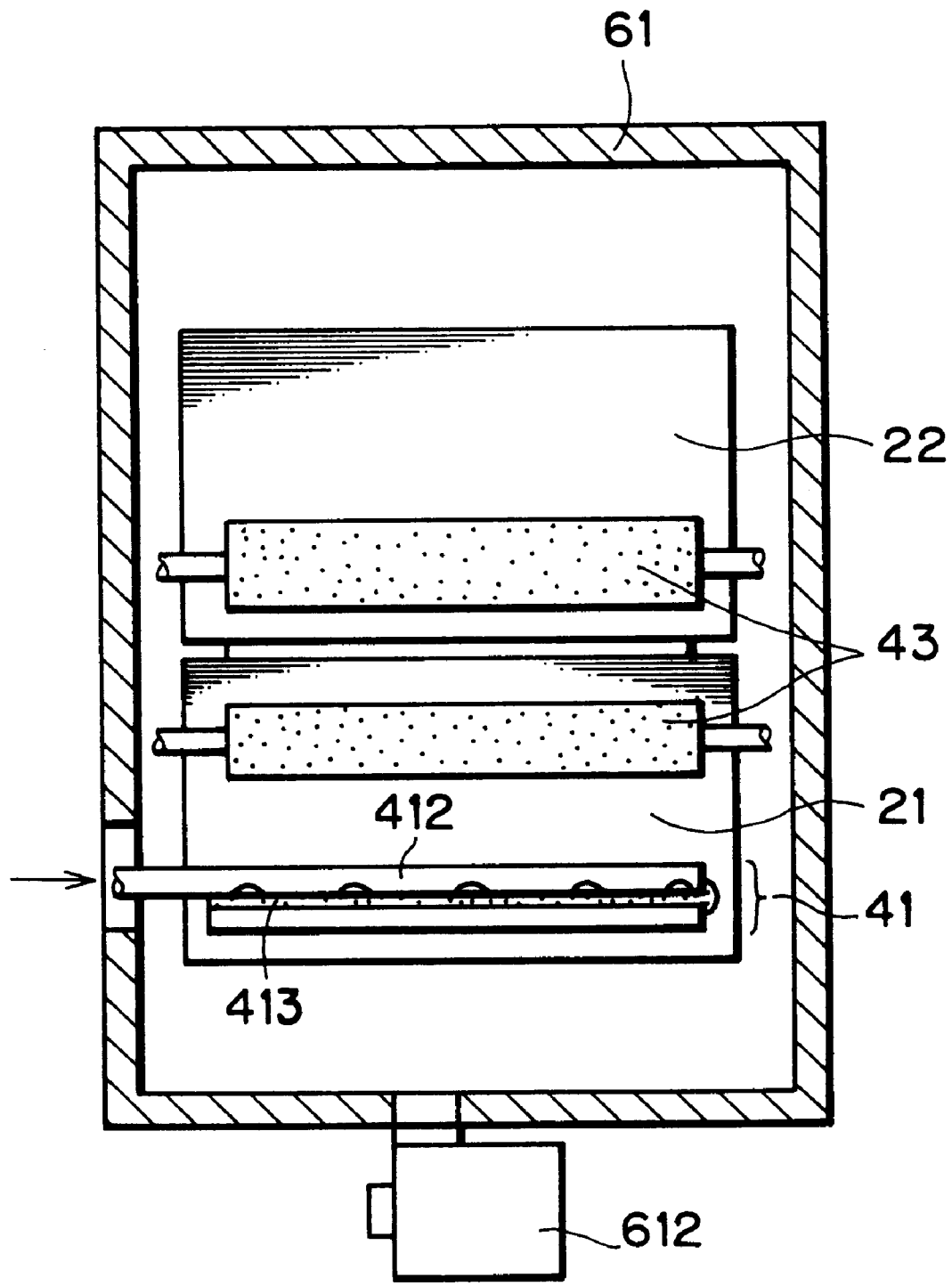
FIG. 2 is a constitutional view of the first embodiment of the present invention as viewed from the side.

A first embodiment of the invention is described with reference to FIGS. 1 and 2. This embodiment employs roll type rolling means 20A as rolling means, uses a liquid 30A as frictional force reducing means, disposes a heating chamber 61 as heating means, and includes a flattening roll 50. A film-coated resin molded material 10 as a workpiece has a film 12 applied to one surface of a matrix resin 11.

The roll type rolling means 20A uses a metal roll comprising a peeling roll 21 and a feeding roll 22 which are perpendicular to the direction of flow of the film-coated resin molded material 10 and disposed on parallel axes. The surface (peripheral surface) of the peeling roll 21 forms a peeling surface 211, while the surface (peripheral surface) of the feeding roll 22 forms a feeding surface 221. In actual operation, the revolution speeds of the rolls 21, 22 are adjusted so that the velocity of the peeling surface 211 is relatively larger than the velocity of the feeding surface 221. The feed speed of the film-coated resin molded material 10 is determined by the velocity of the feeding surface 221.

A flattening roll 50 comprising rolls 51, 52 disposed on parallel axes is provided as a pretreatment process for the film-coated resin molded material 10 as a workpiece. The flattening roll 59 has the function of flattening the film-coated resin molded material (workpiece) 10 having a three-dimensional shape into a two-dimensional shape prior to rolling by the roll type rolling means 20A.

The flattening roll 50 and the roll type rolling means 20A are installed in the heating chamber 61. The inside of the heating chamber 61 is set to be in a predetermined temperature atmosphere by a heater 611 and a blower 612. When the film-coated resin molded material 10 is preheated or the peeling surface 211 or the feeding surface 221 is temperature controlled by the heater 611 and blower 612 of the heating chamber 61, the start-up time can be shortened, if high temperature conditions are to be set during a rolling process. Also, the film-coated resin molded material 10 is softened by preheating, facilitating its flattening treatment by the flattening roll 50.

If desired, the temperatures of the rolls 51, 52 of the flattening roll 50 and the rolls 21, 22 of the roll type rolling means 20A are also set at predetermined values by a heating liquid or an electrical heater.

An applicator type supply device 41 comprises a liquid reservoir 411, a supply pipe 412 and a porous material 413. The porous material 413 is disposed in contact with the peeling surface 211 of the peeling roll 21 and the feeding surface 221 of the feeding roll 22. The liquid reservoir 411 stores a liquid 30A as frictional force reducing means, which is fed through the supply pipe 412 to the porous material 413 such as a sponge material.

The porous material 413 holds the liquid by a capillary action, and applies the liquid 30A to the feeding surface 221 (the surface positioned on the matrix resin 11 side) and the peeling surface 211 (the surface positioned on the film 12 side) of the roll type rolling means 20A.

As the liquid 30a, the use of water is most recommendable, since its boiling point is as high as 100° C.

and its treatment during a subsequent process is easy. If a scraping device 43 for scraping off the liquid 30A adhering to the matrix resin 11 is provided, an oil may be used as the liquid 30A. If washing is carried out during the subsequent process, moreover, the liquid 30A may be a detergent which is a dispersion or solution of a surface active agent.

The liquid 30A is applied by contact of the porous material 413 with a part or the whole of the rolls 21, 22 in the width direction. It is permissible to apply the liquid 30A, frictional force reducing means, only to the peeling roll 21. In FIG. 1, the numeral 70 denotes a guide.

The actions of the instant embodiment are described below.

If the film-coated resin molded material 10 such as a urethane coated polypropylene molded product (e.g., a bumper of an automobile) is subjected to the flattening roll 50, the film-coated resin molded material 10 in the shape of a boat or a box softens upon heating by the heat of the heater 611. The softened workpiece is easily plastic-deformed by rolling by means of the flattening roll 50 to assume a flat form.

The film-coated resin molded material 10 that has passed through the flattening roll 50 moves along the guide 10 placed between the processes, and is passed over to the roll type rolling means 20A.

In the roll type rolling means 20A, the film-coated resin molded material 10 is lubricated by the liquid 30A as frictional force reducing means at the interface between the feeding roll 22 and the matrix resin 11 and the interface between the peeling roll 21 and the film 12. In this state, the film-coated resin molded material 10 undergoes rolling and shearing to have its film 12 removed.

That is, the film-coated resin molded material 10 is pinched and fed between the rotating feeding roll 22 and the peeling roll 21 relatively higher in revolution speed than the feeding roll 22, whereby a rolling force and a shearing force are generated to peel the film 12.

Furthermore, the liquid 30a, frictional force reducing means, is applied to the rolls. Thus, a slip at the interface between the matrix resin 11 and the feeding surface 221, and a slip at the interface between the film 12 and the peeling surface 211 are marked. Since stretching of the film 12 and the matrix resin 11 near the interfaces easily occurs, the peeling of the film 12 is promoted. In addition, the sticking of the matrix resin 11 or film 12 after peeling to the feeding surface 221 or the peeling surface 211 is prevented, permitting continuous removal of the film. If the matrix resin 11 is overheated depending on the operating conditions, the latent heat of evaporation of the liquid 30A deprives it of heat, preventing its temperature rise. Thus, the fusion of the matrix resin 11 can be prevented, and the decrease in the peeling rate can be prevented.

Sticking to the peeling roll 21 was investigated in the presence and absence of application of water as the liquid 30A to the roll, with the temperature of the treating roll being set at 40° C. and 80° C. The results are shown in Tables 1 and 2.

TABLE 1

When the temperature of the treating roll was 40° C.

|  | Sticking to peeling roll | Continuous operation |
| --- | --- | --- |
| Application of water present | No | Possible |
| Application of water absent | Yes | Impossible |

TABLE 2

When the temperature of the treating roll was 80° C.

|  | Film peeling rate |
| --- | --- |
| Application of water present | 95% or more |
| Application of water absent | 70% or less |

Table 1 shows that when the temperature of the rolls 21, 22 of the roll type rolling means 20A is as low as 40° C., the film 12 sticks to the peeling roll 21, making continuous operation difficult; and when, in this case, water is applied to the rolls 21, 22 (at least the peeling roll 21), the film 12 no more sticks to the peeling roll 21, making continuous operation possible.

Table 2 shows that when the temperature of the rolls 21, 22 of the roll type rolling means 20A is as high as 80° C., peeling is difficult, resulting in a lowered peeling rate; and when, in this case, water is applied to the rolls 21, 22 (at least the peeling roll 21), the peeling rate does not lower any more.

The results given in Tables 1 and 2 confirmed that the instant embodiment could solve the two conventional characteristic problems encountered when the surface temperature of the rolls 21, 22 of the roll type rolling means 20A was low and high.

Figure 3:
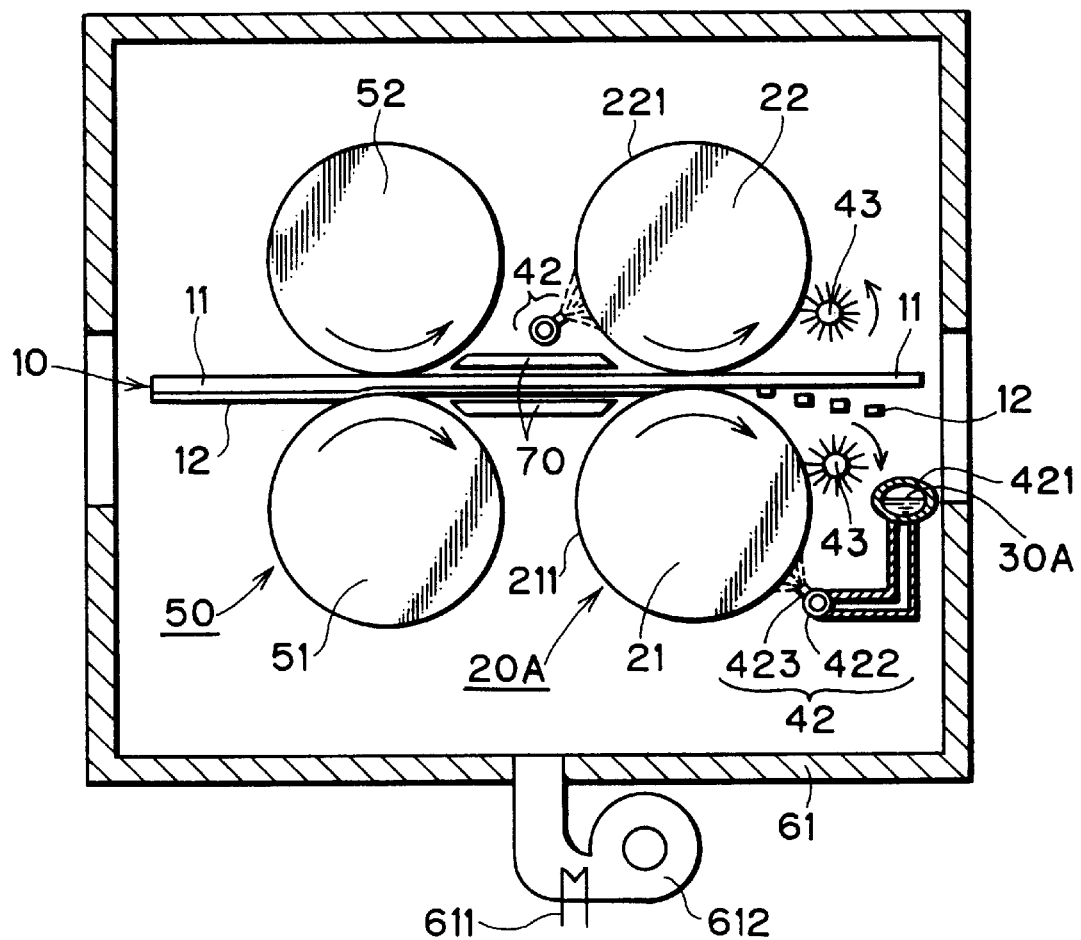
FIG. 3 is a constitutional view of a second embodiment of the present invention as viewed from the front, with a liquid applicator device being changed.
Figure 4:
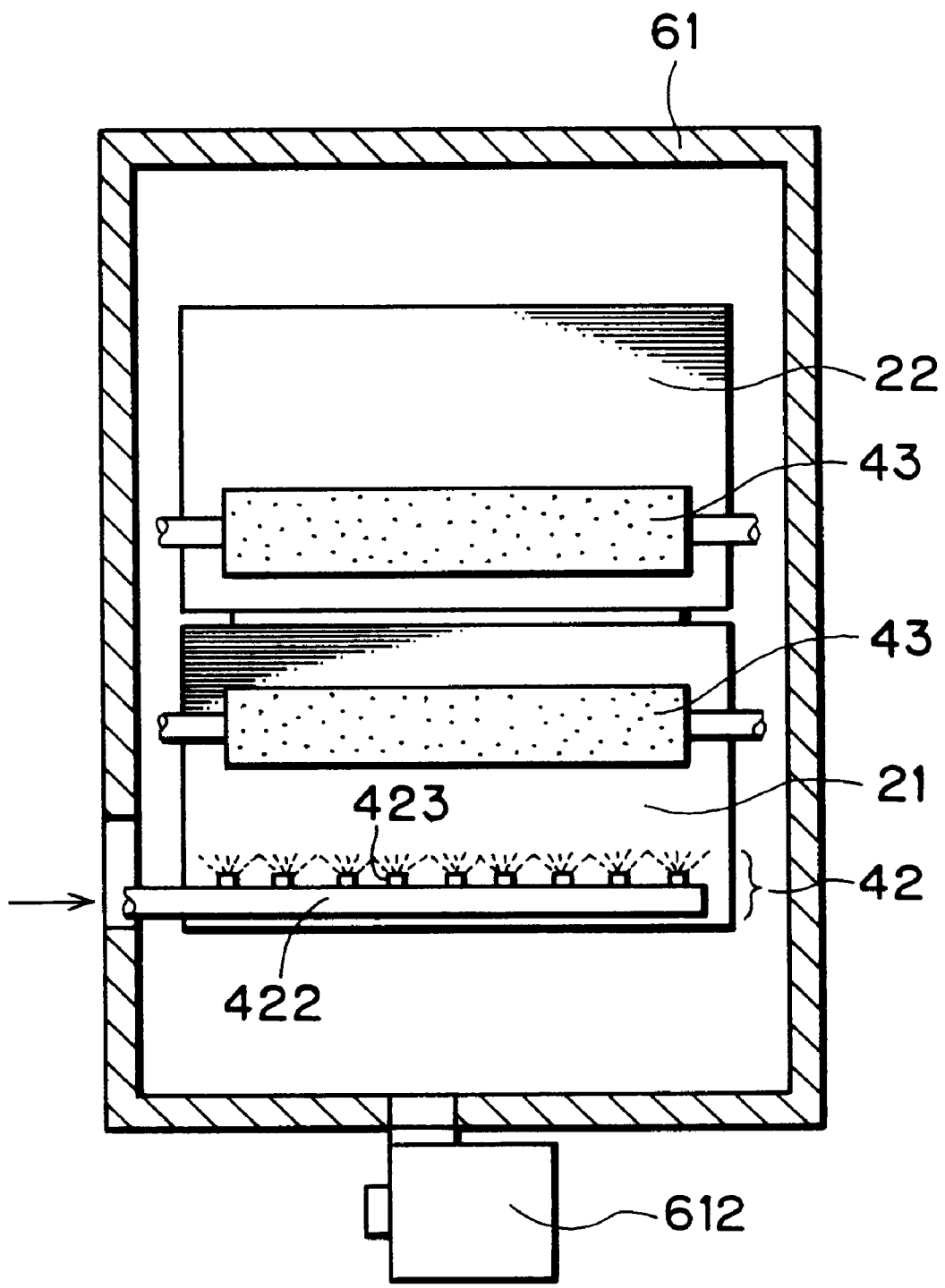
FIG. 4 is a constitutional view of the second embodiment of the present invention as viewed from the side, with the liquid applicator device being changed.

Next, a second embodiment of the present invention will be described with reference to FIGS. 3 and 4. The parts performing the same functions as in the first embodiment are assigned the same numerals and symbols, and overlapping explanations are omitted.

In the second embodiment, a spray type supply device 42 is used to supply a liquid 30A. This spray type supply device 42 is constituted by a liquid reservoir 421, a supply pipe 422 and nozzle holes 423. That is, a suitable pressurization or liquid level difference is given to the liquid reservoir 421, one end of the supply pipe 422 is sealed, and the nozzle holes 423 are provided on the side of the pipe, whereby the spray type supply device 42 is formed. This spray type supply device 42 enables the liquid 30a to be applied to the peeling surface 211 and the feeding surface 221 in a noncontact manner. This noncontact spray type supply device 42 is excellent in that it is free from wear of a contact portion and it gives the same applicator performance as in its initial-phase use even after its long-term use.

The other parts have the same constitution as in the first embodiment.

Figure 5:
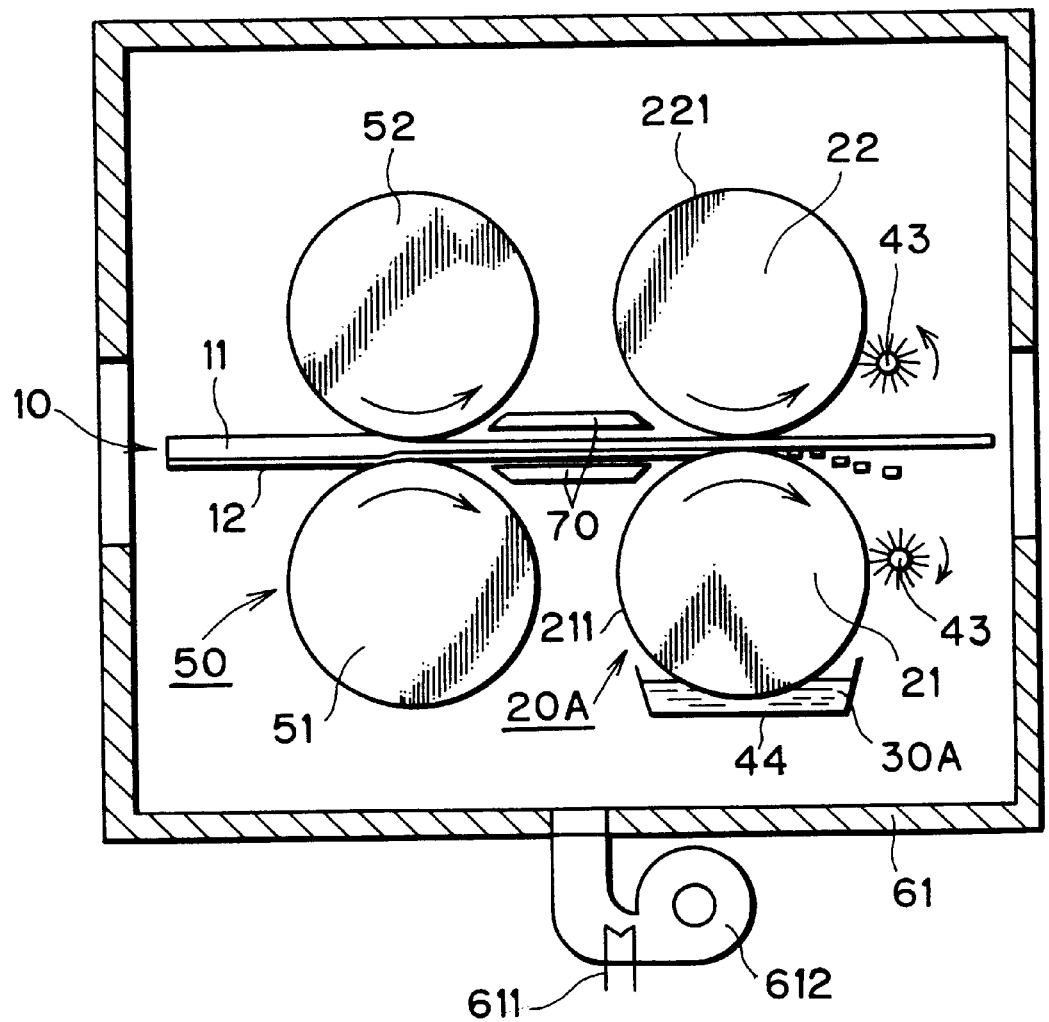
FIG. 5 is a constitutional view of a third embodiment of the present invention as viewed from the front, with a liquid applicator device being changed.
Figure 6:
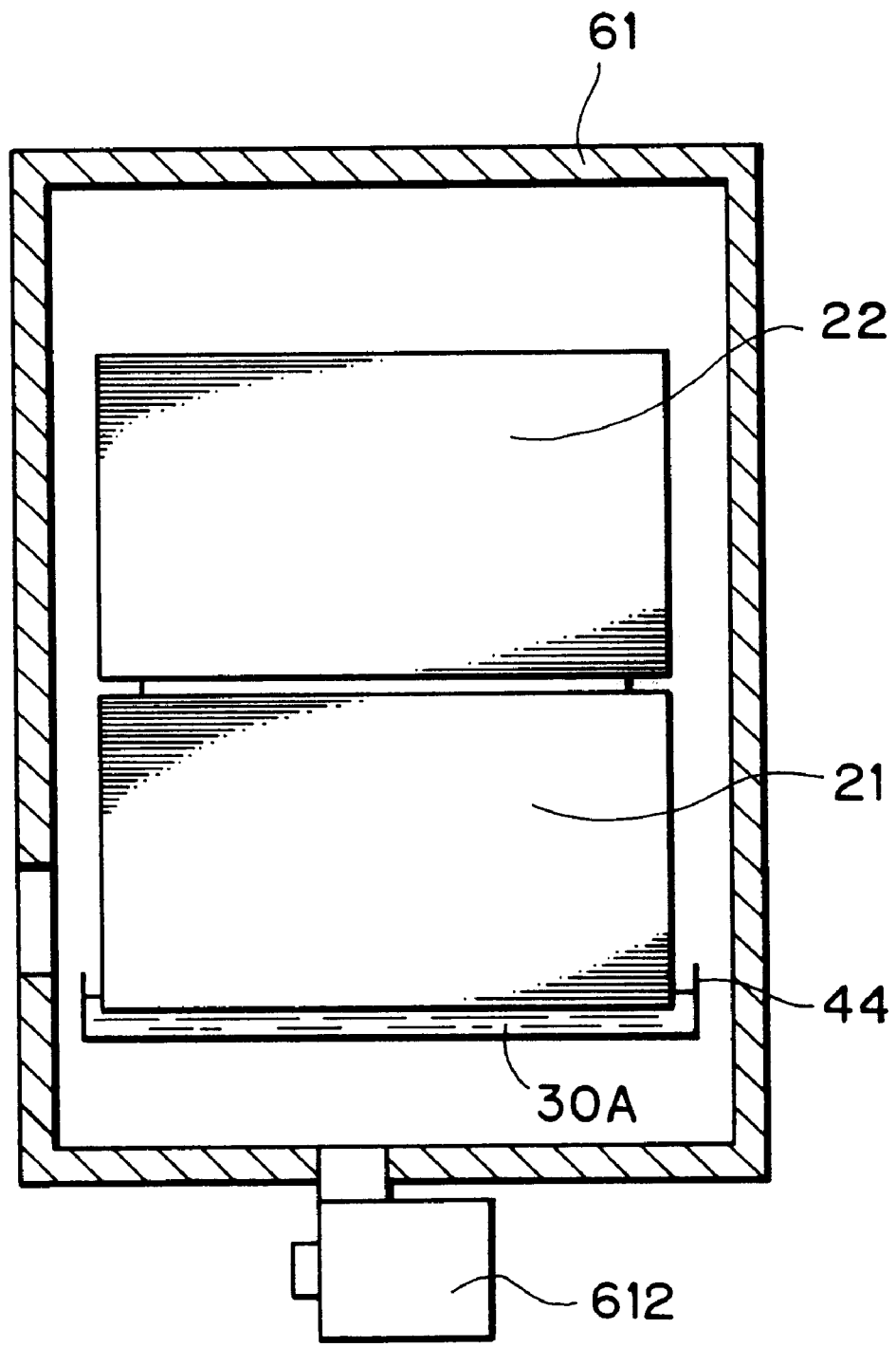
FIG. 6 is a constitutional view of the third embodiment of the present invention as viewed from the side, with the liquid applicator device being changed.

Next, a third embodiment of the present invention will be described with reference to FIGS. 5 and 6. The parts performing the same functions as in the first embodiment are assigned the same numerals and symbols, and overlapping explanations are omitted.

In the third embodiment, the surface of the peeling roll 21 is sunk in a liquid tank (dipping tank) 44 storing the liquid 30a. Thus, the liquid 30A can be easily put to the surface of the peeling roll 21.

It is effective to provide a rotary brush, scraper or the like, which is a scraping device 43 for adjoining the peeling surface 211 or the feeding surface 221 and cleaning the peeled resin on each surface, at a stage prior to the liquid applicator 44.

The other parts have the same constitution as in the first embodiment.

Figure 7:
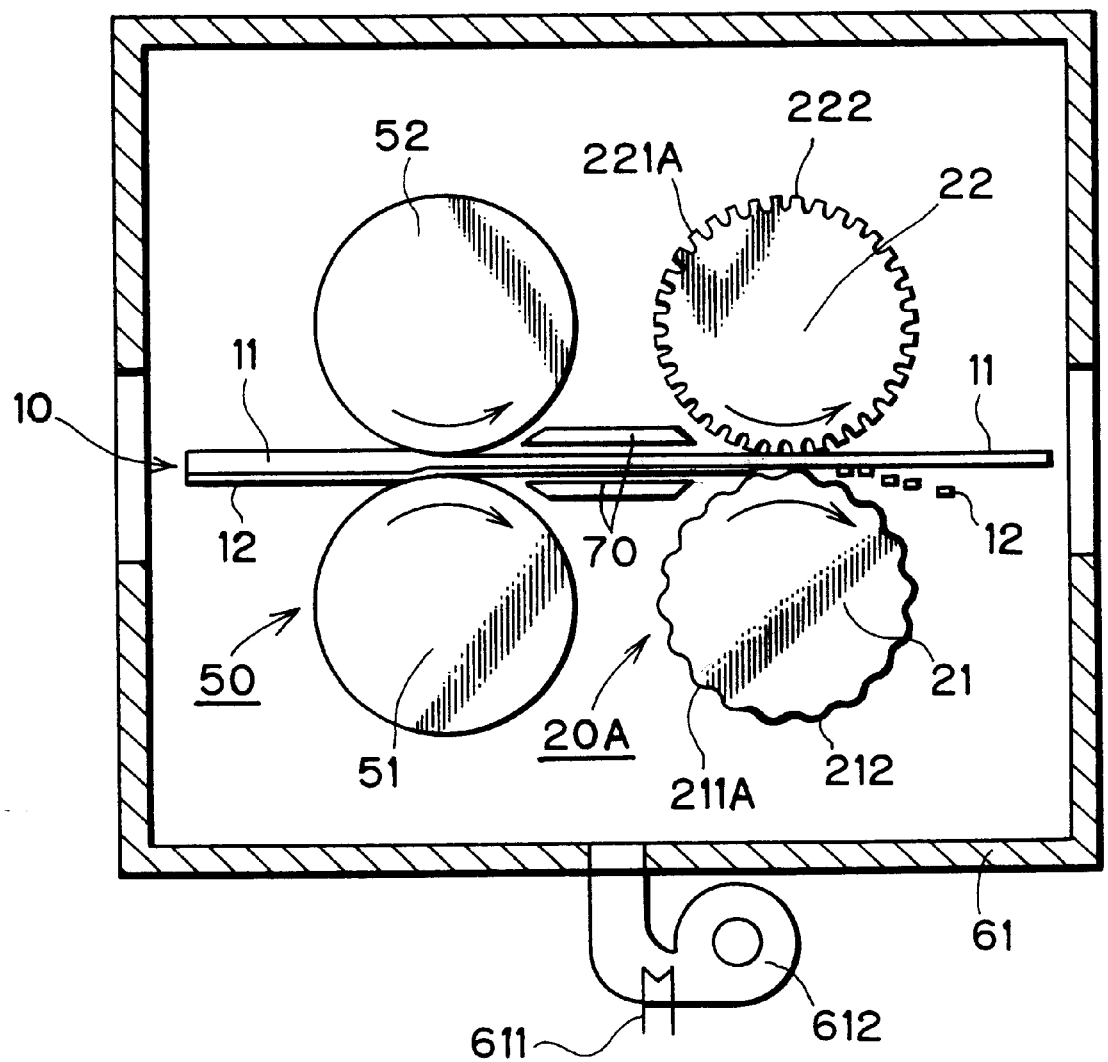
FIG. 7 is a constitutional view of a fourth embodiment of the present invention as viewed from the front, with frictional force reducing means being changed.
Figure 8:
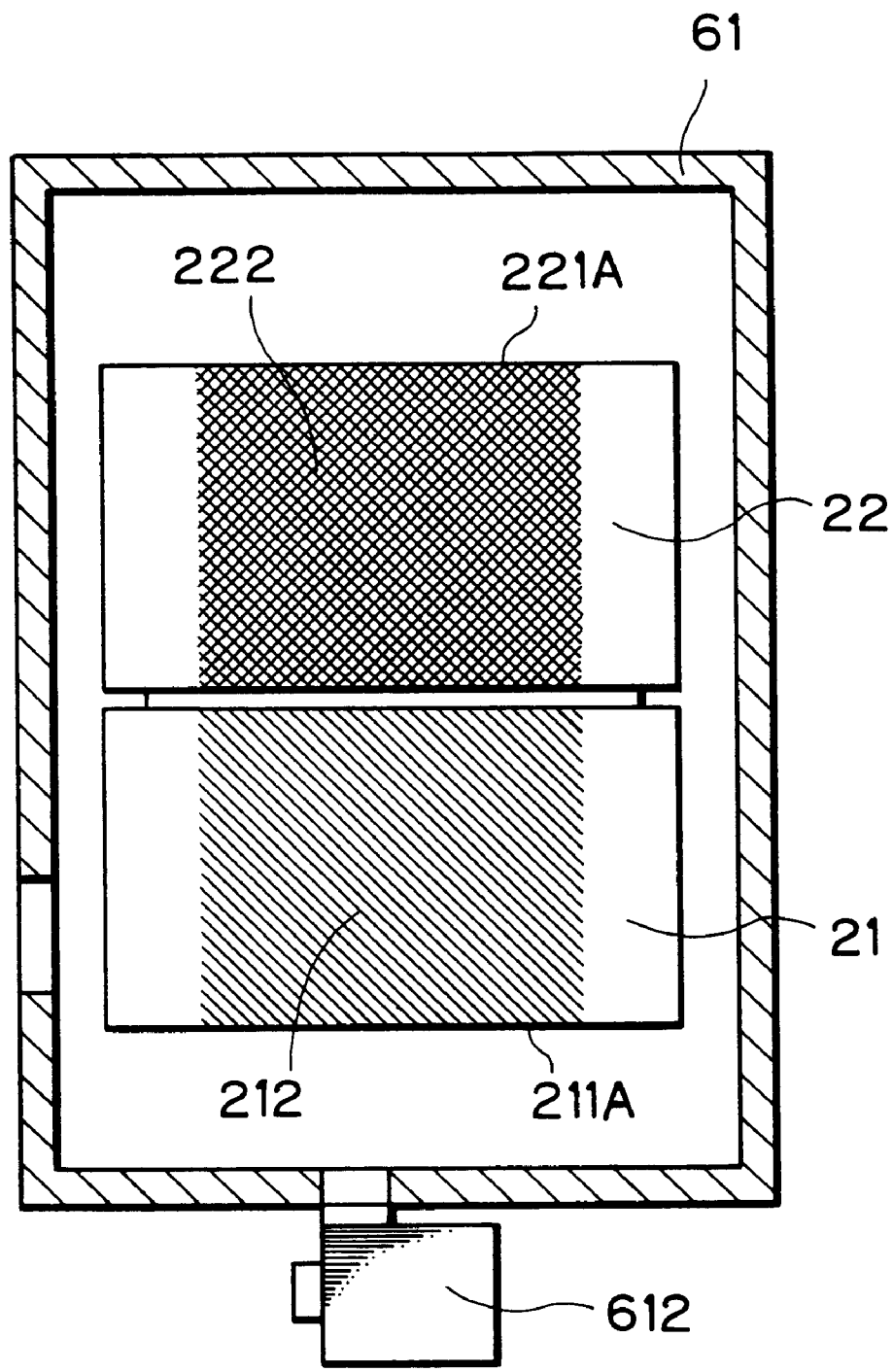
FIG. 8 is a constitutional view of the fourth embodiment of the present invention as viewed from the side, with the frictional force reducing means being changed.

Next, a fourth embodiment of the present invention will be described with reference to FIGS. 7 and 8. The parts performing the same functions as in the first embodiment are assigned the same numerals and symbols, and overlapping explanations are omitted.

In the fourth embodiment, the peripheral surface of a peeling roll 21 (peeling surface) is provided with corrugated irregularities (smooth irregularities with minimal increase in the coefficient of friction) 212 whose cross section is in a corrugated form and whose corrugations are twisted in the axial direction, whereby an uneven peeling surface 211A is formed. The peripheral surface of a feeding roll 22 (feeding surface), on the other hand, is provided with knurls 222 to form an uneven feeding surface 221A.

With the uneven feeding surface 221A, the coefficient of friction between the matrix resin 11 and the uneven feeding surface 221A increases, and so a slip can be prevented. With the uneven peeling surface 211A, if a slip occurs at the interface between the uneven peeling surface 211A and the film 12, deformation on a microscale is imparted to the film 12 and the matrix resin 11, whereby peeling can be promoted.

That is, when the film-coated resin molded material 10 reaches a temperature of about 100° C. or higher, the adhesive strength of the primer lowers, so that the ratio of the peeling effect by shearing to the rolling action increases. To reduce power, therefore, rolling is decreased, and peeling is carried out mainly by shearing. Under this situation, the coefficient of friction between the matrix resin 11 and the surface of the feeding roll 22 decreases with increasing temperature of the surface of the feeding roll. Thus, a slip occurs between the matrix resin 11 and the surface of the feeding roll. The provision of the above-mentioned irregularities can prevent the occurrence of such disadvantage.

Figure 9:
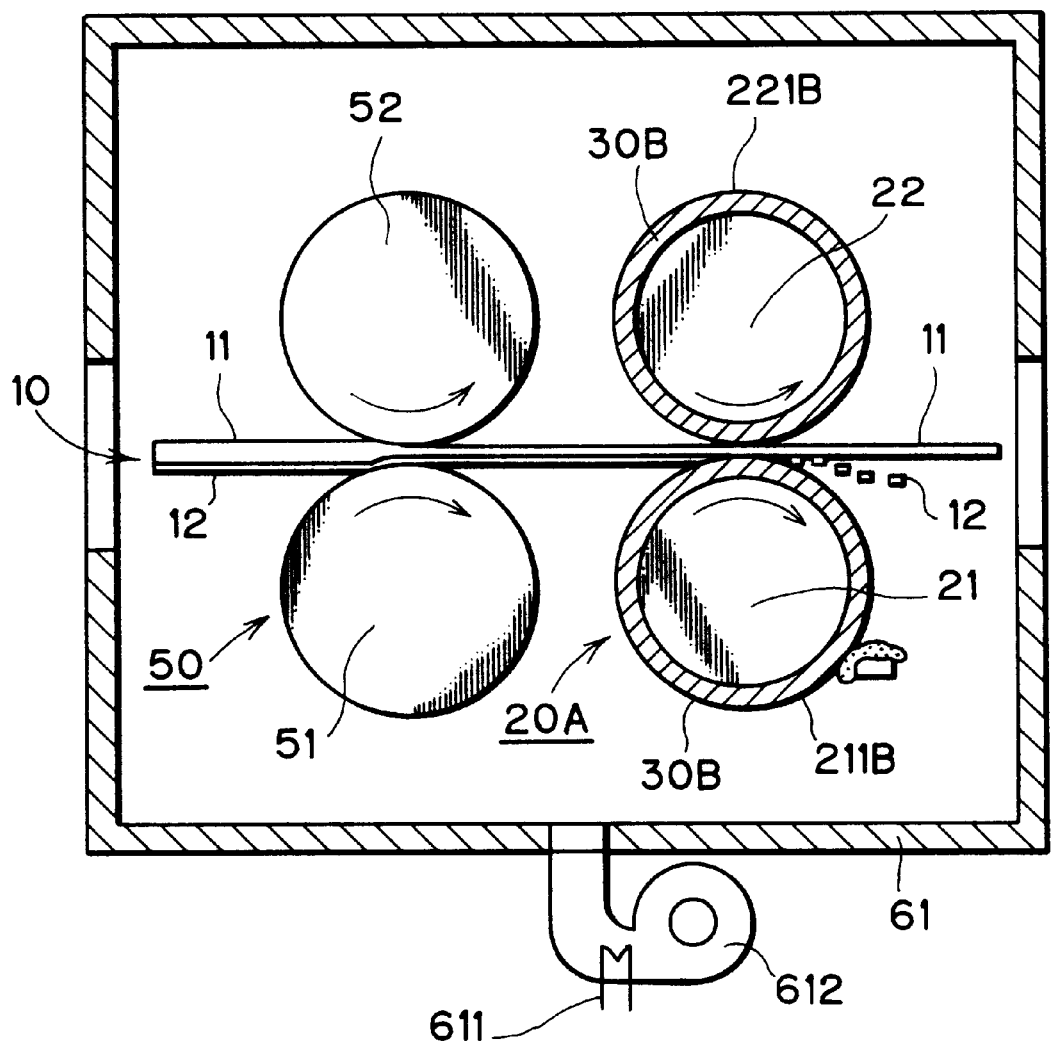
FIG. 9 is a constitutional view of a fifth embodiment of the present invention as viewed from the front, with frictional force reducing means being changed.
Figure 10:
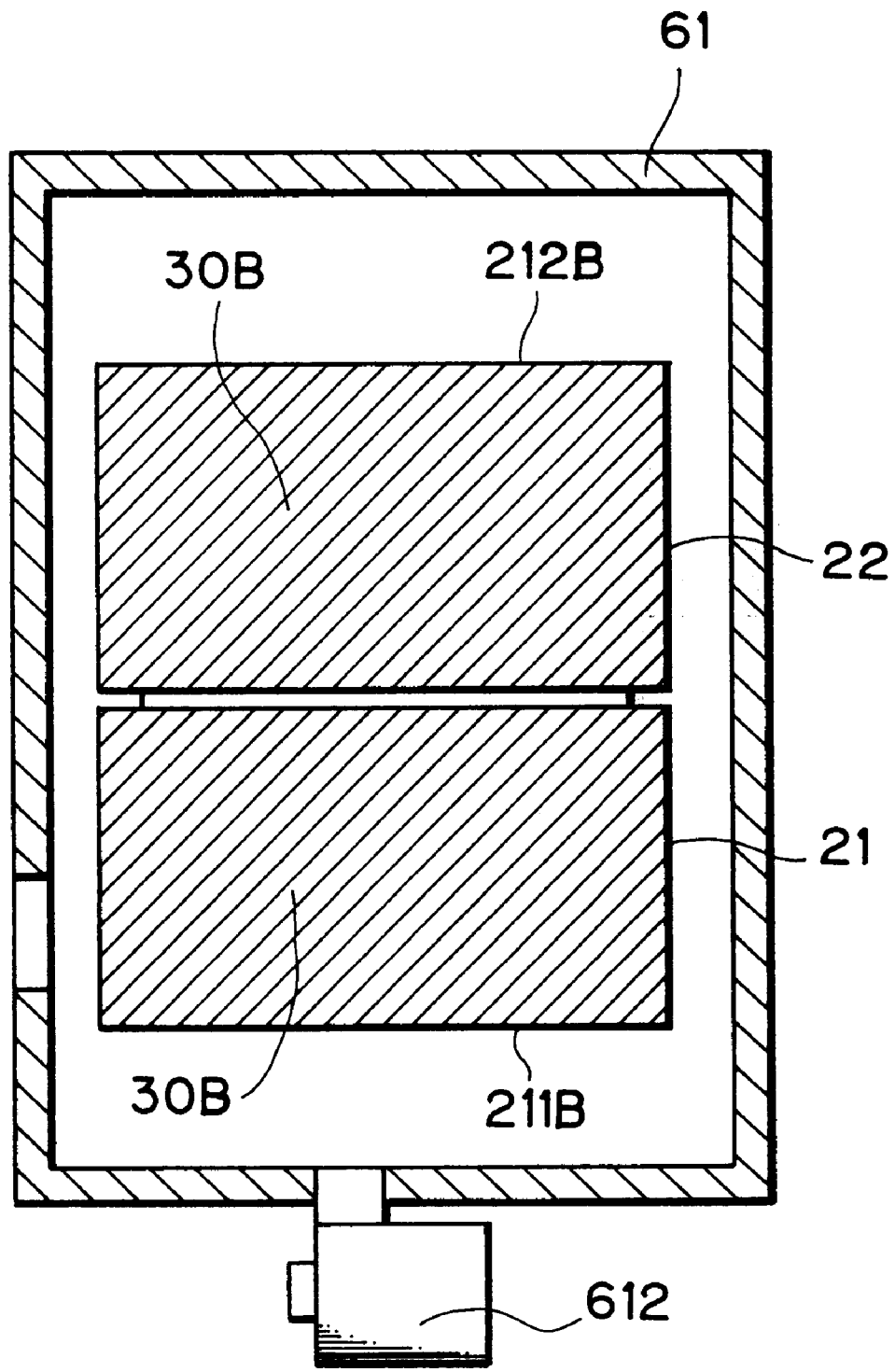
FIG. 10 is a constitutional view of the fifth embodiment of the present invention as viewed from the side, with the frictional force reducing means being changed.

Next, a fifth embodiment of the present invention will be described with reference to FIGS. 9 and 10. The parts performing the same functions as in the first embodiment are assigned the same numerals and symbols, and overlapping explanations are omitted.

In the fifth embodiment, the peripheral surface of a peeling roll 21 (peeling surface) is provided with a resin film (surface treated film) 30B, which is a friction reducing material, to form a film type peeling surface 211B. Alternatively, the peeling surface may be a film type uneven peeling surface of the type comprising the uneven peeling surface 211A illustrated in FIGS. 7 and 8 and the resin film 30B, i.e., a friction reducing material, applied onto the peripheral surface of the uneven peeling surface 211A.

On the other hand, the peripheral surface of a feeding roll 22 (feeding surface) is provided with the same resin film (surface treated film) 30B, which is a friction reducing material, to form a film type feeding surface 221B. Alternatively, the feeding surface may be a film type uneven feeding surface of the type comprising the uneven feeding surface 221A illustrated in FIGS. 7 and 8 and the surface treated film 30B, i.e., a friction reducing material, applied onto the peripheral surface of the uneven feeding surface 221A. For the resin film (surface treated film) 30B, surface treatment such as Teflon coating or ceramic coating is adopted.

In this case, instead of the resin film 30B as a surface coating material, a substance which lowers the coefficient of friction with the matrix resin 11 or the film 12 may be coated in a roll form, or a roll may be composed of such a substance.

In either case, the film type feeding surface 221B and the film type peeling surface 211B show the friction reducing action of the resin film 30B and the action of the surface irregularities. Thus, removal of the film is promoted based on the action by the frictional force reducing means (resin film 30B) and the action by the irregularities.

Figure 11:
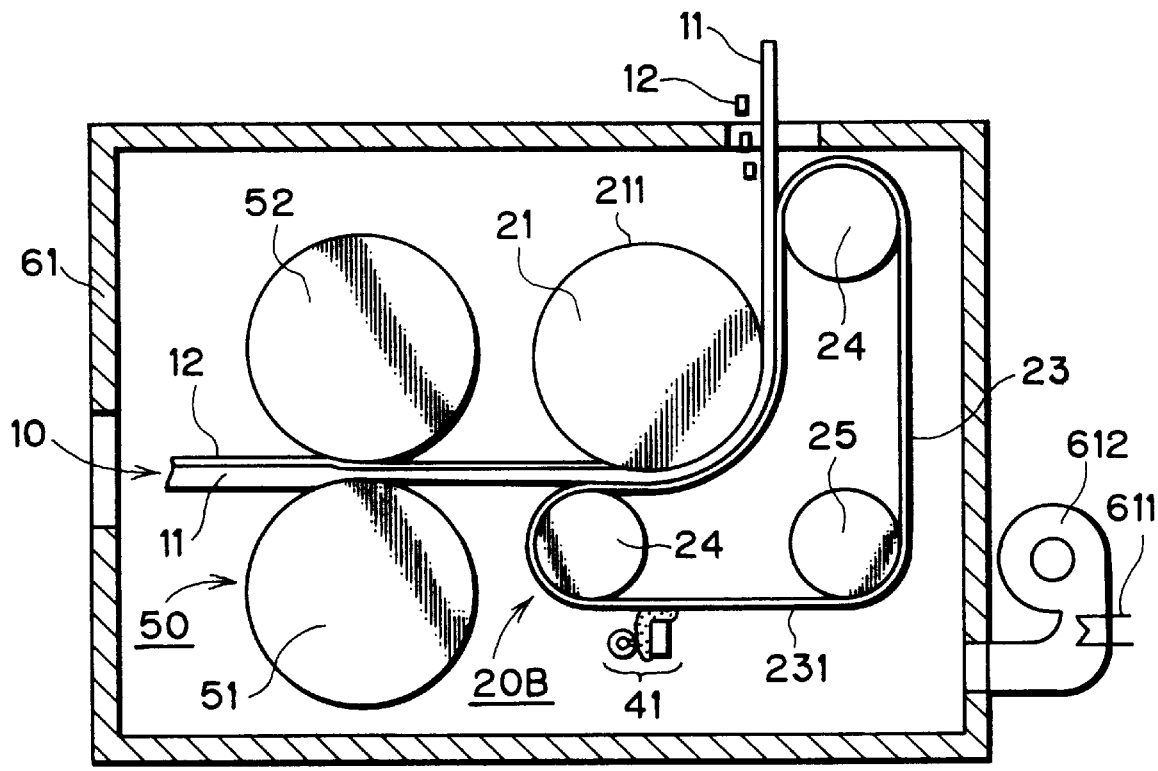
FIG. 11 is a constitutional view of a sixth embodiment of the present invention as viewed from the front, with rolling means being changed.

Next, a sixth embodiment of the present invention will be described with reference to FIG. 11. The parts performing the same functions as in the first embodiment are assigned the same numerals and symbols, and overlapping explanations are omitted.

In the sixth embodiment, belt type rolling means 20B is employed. The belt type rolling means 20B is composed of a peeling roll 21 and a metal belt 23.

The peeling roll 21 has the same constitution as already described. The metal belt 23 is supported by two support rolls 24 and at least one tension adjusting roll 25 from its inside so as to be movable in an endless manner and with a moderate tension given thereto. The belt 23, when placed between the two support rolls 24, is disposed so as to surround a part of the peeling roll 21 from its outer peripheral side on a circumference spaced by a predetermined gap from the surface of the peeling roll 21.

The film-coated resin molded material 10 is supplied and continuously fed with its film 12 facing the peeling roll 21 and its matrix resin 11 facing the metal belt 23. Simultaneously, the film-coated resin molded material 10 is pressed between a feeding surface 231 of the metal belt 23 and a peeling surface 211 of the peeling roll 21 under the tension of the metal belt 23 to undergo a rolling action.

If the velocity of the peeling surface 211 of the peeling roll 21 is made higher than the velocity of the feeding surface 231 of the metal belt 23, two surfaces are formed which have a rolling action and whose relative velocity is greater on the film side. These two surfaces are the peeling surface 221 in the peeling roll 21 and the feeding surface 231 on the belt side. By the same action as produced by the roll type rolling means, the film 12 is removed.

The frictional force reducing means applied in the case of the roll type rolling means is not very difficult to apply in the present case. Thus, the use of the aforementioned various frictional force reducing means (the application of a liquid and the provision of a surface treated film) in the belt type rolling means 20B gives the same actions and effects as obtained in the case of the roll type rolling means. However, the belt is limited in tension, and thus it is suitable particularly when the workpiece 10 is preheated as pretreatment. The technique of imparting irregularities to the peripheral surface of the peeling roll 21 (peeling surface) may also be employed.

If a fine powder (e.g. talc, an inorganic material) is used and supplied to the interface as frictional force reducing means, the same effects as in the case of liquid can be obtained, such as penetration in to the peeling surface and the action of coating the surface of the peelings.

As described above, the film removing device for a rein molded material according to the present invention produces the following effects:

1) It is possible to broaden the ranges of the temperatures and peripheral velocities of the feeding means and the peeling means in which the film can be peeled. Also, the peeling efficiency can be increased.

2) The operating property and the treating speed can be improved markedly.

3) Stretching and shearing deformation can be utilized efficiently for the peeling of the film. Thus, the energy required for treatment can be reduced.

What is claimed is:

1. A film removing device for a film-coated resin molded material having a film coated on one surface of a matrix resin, said film removing device comprising rolling means;

said rolling means having a peeling surface in continuous contact with the film-coated resin molded material from the film side, and a feeding surface in continuous contact with the film-coated resin molded material from the resin side; the velocity of the peeling surface being made relatively higher than the velocity of the feeding surface in the direction of travel of the film-coated resin molded material; said rolling means being adapted to compress and stretch the film-coated resin molded material by the peeling surface and the feeding surface, while continuously pinching and feeding the film-coated resin molded material by the two surfaces;

said film removing device exerting a shearing force between the film and the matrix resin of the film-coated resin molded material by using a difference in elongation between the matrix resin and the film, and a difference in relative velocity between the feeding surface and the peeling surface, thereby peeling the film from the matrix resin;

said film removing device further including frictional force reducing means for reducing a frictional force at least at the interface between the film and the peeling surface.

2. The film removing device of claim 1, further including heating means capable of heating the film-coated resin molded material prior to a rolling action by said rolling means.

3. The film removing device of claim 2, further including flattening means which is composed of two rolls disposed on parallel axes and which flattens the resin molded material having a three-dimensional shape into a two-dimensional shape prior to a rolling action by said rolling means.

4. The film removing device of claim 1, 2 or 3, wherein said rolling means comprises a peeling roll and a feeding roll which are two cylindrical rolls perpendicular to the direction of flow of the film-coated resin molded material and disposed on parallel axes on both sides of the surface of the film and the surface of the matrix resin, respectively.

5. The film removing device of claim 1 or 3, wherein said rolling means comprises a cylindrical peeling roll, and a metal belt supported in an endless form by at least three rolls, provided so as to surround a part of the circumference of the peeling roll from the outer peripheral side of the peeling roll, and pinching the film-coated resin molded material in collaboration with the surface of the peeling roll to make the film-coated resin molded material pressable continuously toward the center of the peeling roll.

6. The film removing device of claim 4, wherein said rolling means comprises a peeling roll having a peeling surface which is a corrugated uneven surface whose cross section perpendicular to the axis is in a corrugated form and whose corrugations are twisted in the axial direction, and one of a feeding roll having a feeding surface which is a knurled uneven surface; and a metal belt.

7. The film removing device of claim 1 or 2, wherein said frictional force reducing means is a liquid which does not dissolve the film or the matrix resin.

8. The film removing device of claim 7, wherein said liquid is a material selected from water, a detergent and an oil.

9. The film removing device of claim 1 or 2, wherein said frictional force reducing means is a surface treated film coated on the feeding surface or the peeling surface.

10. The film removing device of claim 1 or 2, wherein said frictional force reducing means is a fine powder inserted into the interface between the feeding surface or the peeling surface and the surface of the film-coated resin molded material.

11. The film removing device of claim 7, wherein said liquid can be supplied by an applicator type or spray type liquid supply device.

12. The film removing device of claim 7, wherein said liquid can be supplied by a liquid supply device composed of a dipping tank where the surface of one of the feeding roll and the peeling roll can be partly dipped.

* * * * *